(12) United States Patent
Lee

(10) Patent No.: US 8,155,470 B2
(45) Date of Patent: Apr. 10, 2012

(54) DEVICE FOR REMOVING NOISE IN IMAGE DATA

(75) Inventor: Ho-Young Lee, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 939 days.

(21) Appl. No.: 12/159,386

(22) PCT Filed: Sep. 15, 2006

(86) PCT No.: PCT/KR2006/003695
§ 371 (c)(1),
(2), (4) Date: Jun. 26, 2008

(87) PCT Pub. No.: WO2007/074964
PCT Pub. Date: Jul. 5, 2007

(65) Prior Publication Data
US 2009/0010561 A1    Jan. 8, 2009

(30) Foreign Application Priority Data

Dec. 29, 2005 (KR) .......................... 10-2005-0133585

(51) Int. Cl.
| G06K 9/40 | (2006.01) |
| H04N 9/74 | (2006.01) |
| H04N 5/00 | (2006.01) |
| H04N 1/60 | (2006.01) |
| H04N 1/40 | (2006.01) |
| H04N 1/38 | (2006.01) |

(52) U.S. Cl. ........ 382/261; 382/254; 348/597; 348/606; 358/1.9; 358/447; 358/461; 358/463

(58) Field of Classification Search ........................ None
See application file for complete search history.

(56) References Cited

U.S. PATENT DOCUMENTS

| 5,699,126 A | * | 12/1997 | Hong ............................. 348/625 |
| 6,064,776 A | * | 5/2000 | Kikuchi et al. ................. 382/260 |
| 2003/0142878 A1 | * | 7/2003 | Willis et al. ..................... 382/260 |
| 2005/0157941 A1 | | 7/2005 | Lim et al. |
| 2007/0086673 A1 | * | 4/2007 | Witter et al. ................... 382/269 |
| 2008/0298722 A1 | * | 12/2008 | Lee et al. ....................... 382/300 |

FOREIGN PATENT DOCUMENTS

| KR | 10-1998-016572 A | 6/1998 |
| KR | 10-2005-0075542 | 7/2005 |
| WO | WO-01/20551 A1 | 3/2001 |

* cited by examiner

*Primary Examiner* — Randolph I Chu
(74) *Attorney, Agent, or Firm* — Birch, Stewart, Kolasch & Birch, LLP

(57) ABSTRACT

A device for removing noise by using an adjustable threshold. The device for removing noise in accordance with an embodiment of the present invention determines a difference value between a maximum value and a minimum value of elements of inputted image data, determines a method of removing noise of the image data in accordance with the difference value, and removes noise in accordance with the method. With the present invention, improved picture quality can be achieved because noise can be removed as desired by the user.

11 Claims, 9 Drawing Sheets

FIG. 5

| 1 | 2 | 1 |
|---|---|---|
| 2 | 4 | 2 |
| 1 | 2 | 1 |

| -1 | -2 | -1 |
|---|---|---|
| 0 | 0 | 0 |
| 1 | 2 | 1 |

| -1 | 0 | 1 |
|---|---|---|
| -2 | 0 | 2 |
| -1 | 0 | 1 |

— 232

DEVICE FOR REMOVING NOISE IN IMAGE DATA

CROSS-REFERENCE TO RELATED APPLICATIONS

This application claims foreign priority benefits under 35 U.S.C. .sctn. 119(a)-(d) to PCT/KR2006/003695, filed Sep. 15, 2006, which is hereby incorporated by reference in its entirety.

BACKGROUND

1. Technical Field

The present invention relates to a device for removing noise by using an adjustable threshold, more specifically to a device used in, for example, an image processing system for removing noise by using an adjustable threshold.

2. Description of the Related Art

In general, color interpolation in an image processing system refers to generating new color information from the existing color information when an image signal is converted according to a standard method.

As color interpolation involves generating elements that are not present at a current location, using other elements surrounding a pixel, zipper noise is often generated at a high-frequency location (e.g. an edge or boundary).

FIG. 1 is an example showing how zipper noise is generated in related image processing steps.

As shown by the red block in FIG. 1, zipper noise occurs at the edge or boundary during the conventional image processing.

Although several methods have been disclosed to remove this kind of noise, these methods have not been able to carry out the process according to the image since they are applied equally to every image after the system is structured. In other words, they process the noise regardless of the properties of the noise, by applying the same noise processing method to an image.

SUMMARY

In order to solve the above problems, the present invention provides a device for removing noise that applies a noise removing method according to the image by adjusting the threshold according to the characteristic value in the mask of the image.

Other objects of the present invention will become more apparent through the following description.

To solve the above problem and other problems, an embodiment of the present invention features a device for removing noise that has a first arithmetic unit, which determines a difference value between a maximum value and a minimum value of elements of inputted image data, a first determining unit, which determines a method of removing noise of the image data in accordance with the difference value received from the first arithmetic unit, and a noise removing unit, which removes noise in accordance with the method determined by the first determining unit.

The first arithmetic unit has a second determining unit, which determines the maximum value of elements constituting the image data, a third determining unit, which determines the minimum value of elements constituting the image data, and a fourth determining unit, which determines the difference value between the maximum value and the minimum value. The noise removing unit has a first filter unit, which filters the image data, and a second filter unit which filters the image data to remove zipper noise.

The first determining unit determines to have filtering executed by inputting the image data to the first filter unit if the difference value is smaller than a first threshold that is determined according to a luminance level of an image. It is preferable that the first filter unit is a Gaussian filter.

The first determining unit determines that the output is a value of a middle element of the image data if the difference value is substantially greater than or equal to a first threshold and smaller than a second threshold that is determined according to an edge level of an image, and determines to have filtering executed by inputting the image data to the second filter unit if the difference value is substantially greater than or equal to the second threshold. It is preferable that the second filter unit has a first filter, which determining a horizontal edge of the image data, a second filter, which determines a vertical edge of the image data, a first calculation unit, which calculates an absolute value (abs_S1) of a sum of elements outputted from the first filter, a second calculation unit, which calculates an absolute value (abs_S2) of a sum of elements outputted from the second filter, a second arithmetic unit which obtains a sum (abs_S) of output of the first calculation unit and the second calculation unit, and a control unit, which determines output data according to the output of the second arithmetic unit.

The control unit determines that output data is a value of a middle element of the image data if abs_S is smaller than a third threshold, that output data is an average of horizontal middle row, whose center is added by a weight, if abs_S is greater than the third threshold, and abs_S1 is greater than what abs_S2 is added by a fourth threshold, and that output data is an average of vertical middle column, whose center is added by a weight, if abs_S is greater than the third threshold, and abs_S2 is greater than what abs_S1 is added by the fourth threshold. Furthermore, the control unit determines that output data is an average of horizontal/vertical middle row/column, whose center is added by a weight, if abs_S is greater than the third threshold, and either abs_S1 is smaller than what abs_S2 is added by the fourth threshold, or abs_S2 is smaller than what abs_S1 is added by the fourth threshold.

BRIEF DESCRIPTION OF THE DRAWINGS

FIG. 5 shows an example of a Gaussian filter unit;

FIGS. 7 and 8 show examples of a first filter and a second filter, respectively, shown in FIG. 6;

DETAILED DESCRIPTION

Figure 1:
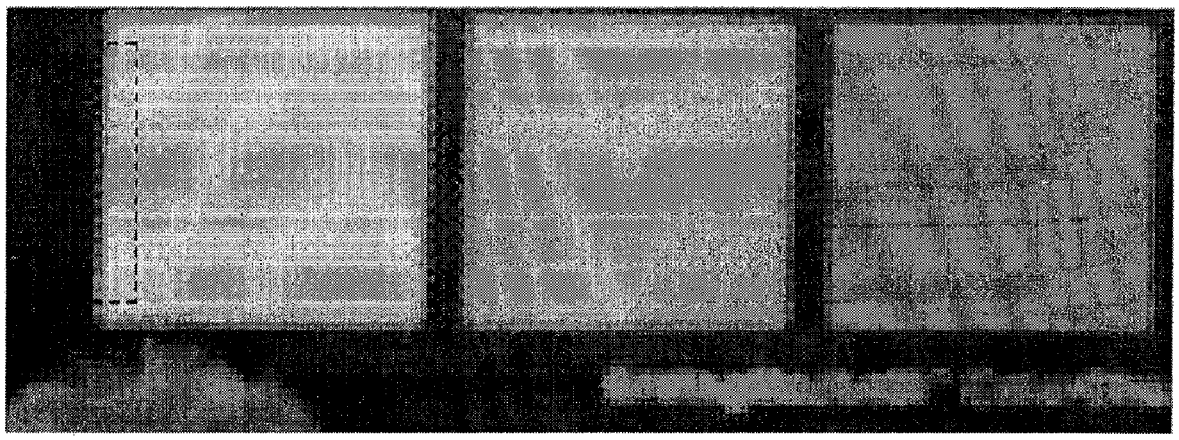
FIG. 1 shows an example of how zipper noise is generated in related image processing steps.

The above objects, features and advantages will become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

Figure 2:
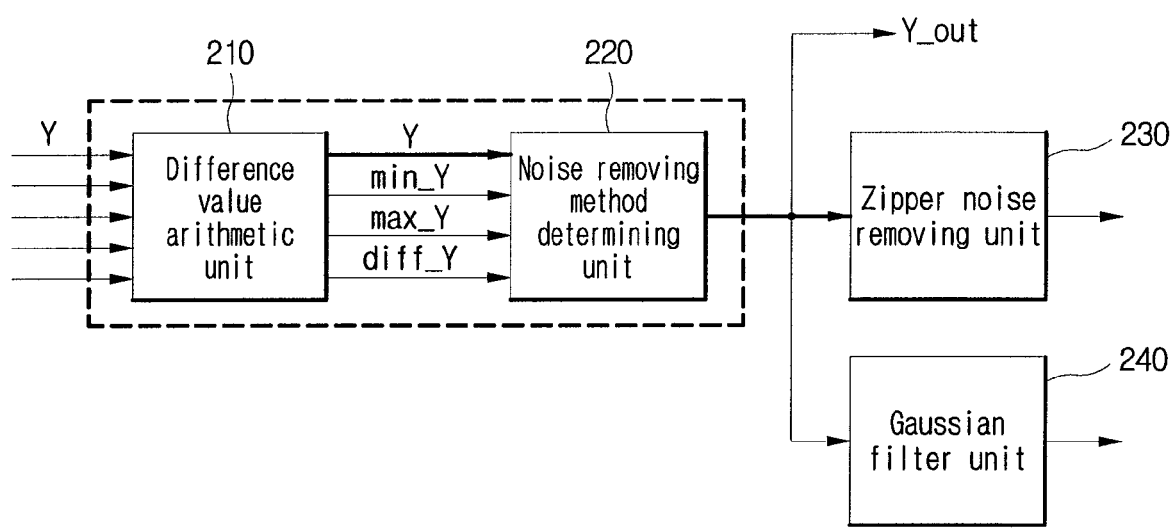
FIG. 2 shows the structure of a noise removing device using an adjustable threshold in accordance with an embodiment of the present invention.

FIG. 2 is a block diagram showing the structure of a noise removing device using an adjustable threshold in accordance with an embodiment of the present invention.

As shown in the figure, the removing device of the present invention comprises a difference value arithmetic unit 210, a noise removing method determining unit 220, a zipper noise removing unit 230, and a Gaussian filter unit 240.

In the following description, luminance (Y) data being inputted to the device for removing noise will be described. However, red (R)/green (G)/blue (B) data may be also used because the RGB data and Y data can be easily converted through a mathematical formula.

The difference value arithmetic unit 210 of FIG. 2 calculates a maximum value and a minimum value of an element for the inputted Y data having a 3×3 structure. Below is the operation of the difference value arithmetic unit 210 with reference to FIG. 3.

Figure 3:
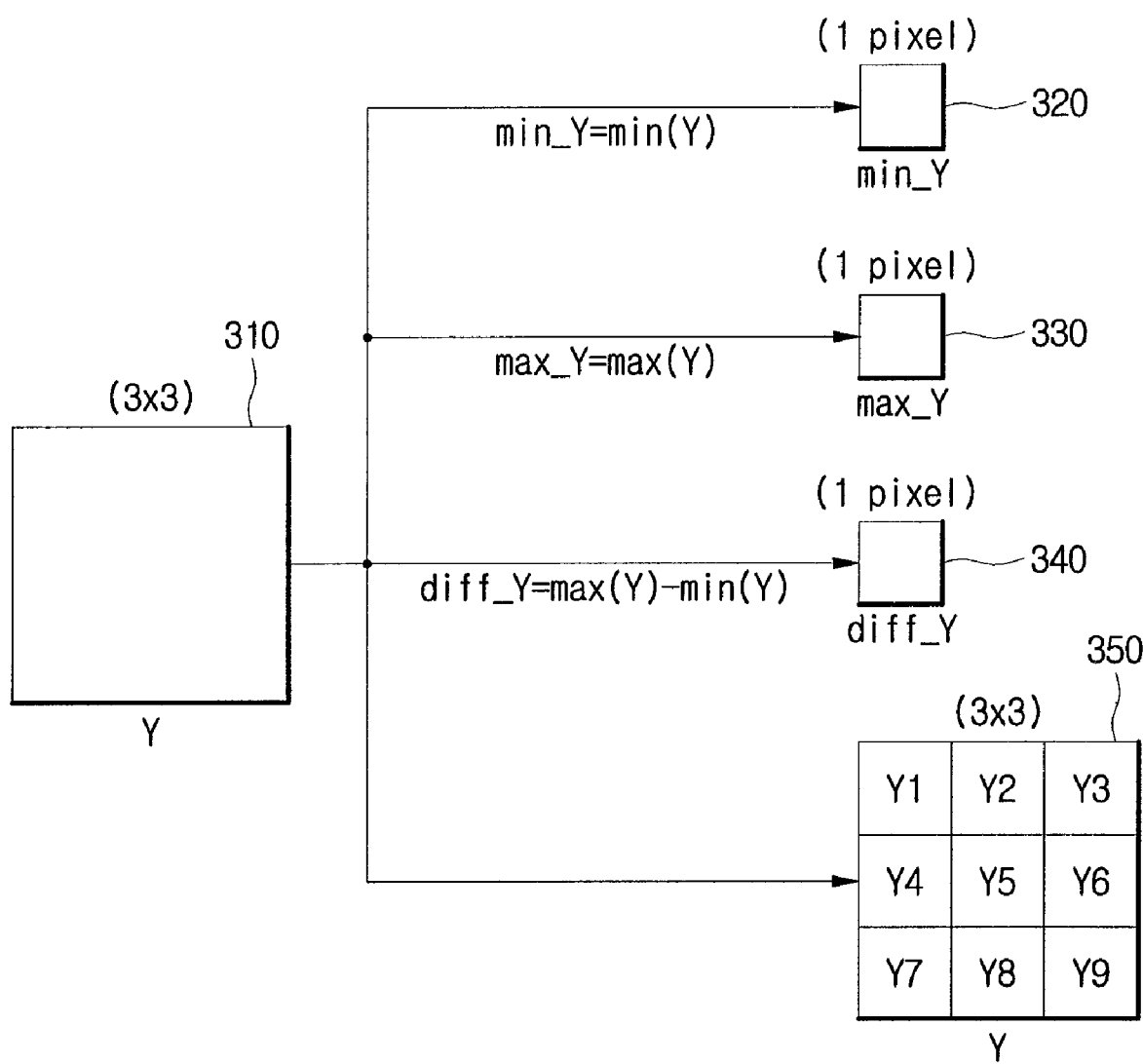
FIG. 3 shows a conceptual diagram illustrating the operation of a difference value arithmetic unit shown in FIG. 2.

FIG. 3 is a conceptual diagram illustrated to describe the operation of the difference value arithmetic unit shown in FIG. 2.

As shown in the drawing, the difference value arithmetic unit 210 determines an element with the smallest value as min_Y 320, the minimum value of 1 pixel, and an element with the greatest value as max_Y 330, the maximum value of 1 pixel, among the elements composing the inputted Y data 310 having a 3×3 structure. Using these determined minimum value and maximum value, diff_Y 340, the difference of these two values, is determined. Meanwhile, Y data 350 having a 3×3 structure gets bypassed to remove noise.

Figure 4:
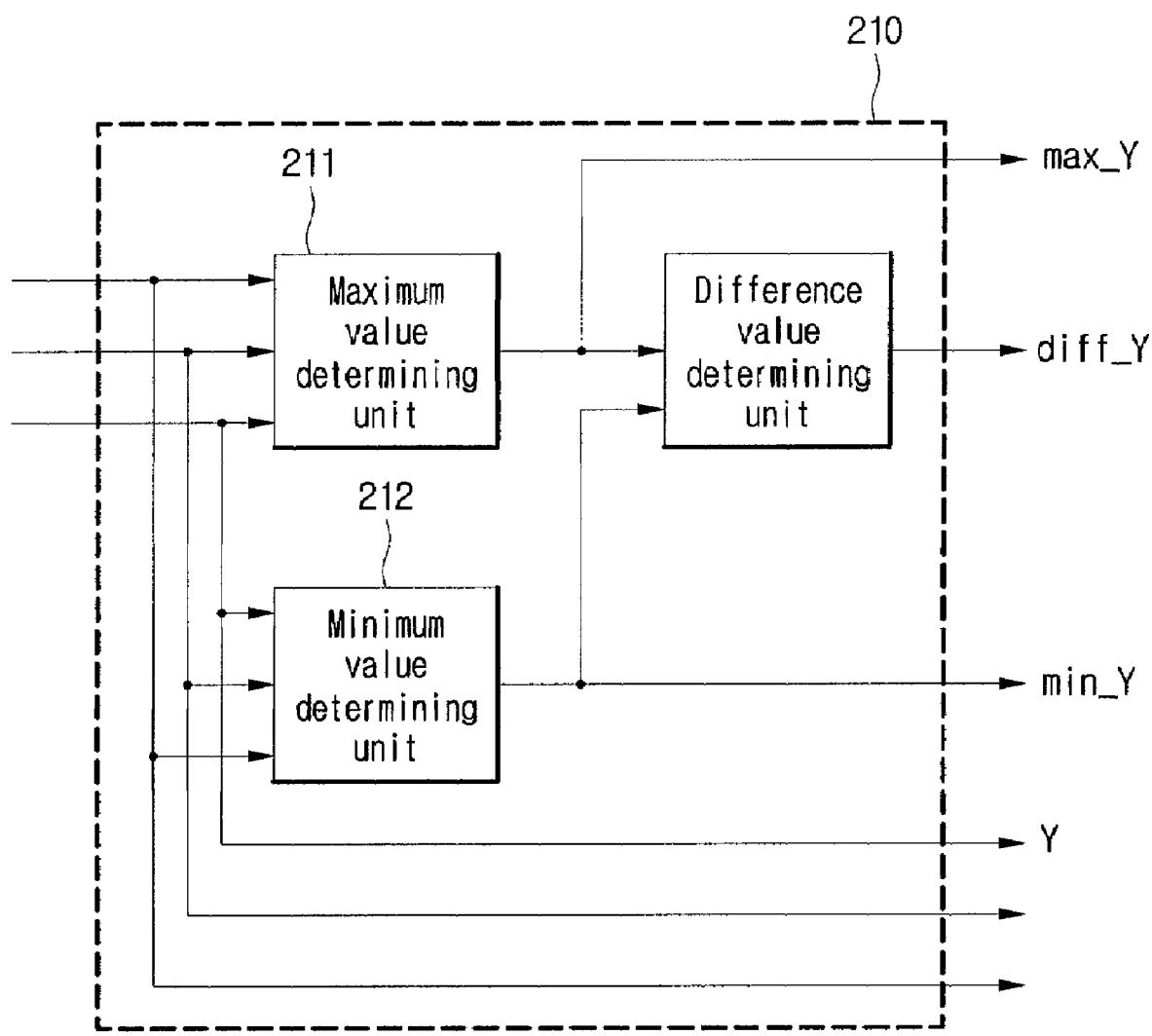
FIG. 4 shows a block diagram illustrating the structure of an embodiment of the difference value arithmetic unit shown in FIG. 2.

FIG. 4 is a block diagram illustrating the structure of an embodiment of the difference value arithmetic unit shown in FIG. 2;

As shown in the figure, the difference value arithmetic unit 210 of the present invention comprises a maximum value determining unit 211, a minimum value determining unit 212, and a difference value determining unit 213.

The maximum value determining unit 211 determines max_Y, which is a maximum value among the elements of the Y data having a 3×3 structure, and the minimum value determining unit 212 determines min_Y, which is a minimum value among the elements of the Y data having a 3×3 structure. The difference value determining unit 213 determines diff_Y, which is a difference value between the maximum value and minimum value received from the maximum value determining unit 211 and the minimum value determining unit 212, respectively.

The noise removing method determining unit 220 presets a first threshold (thr1) and a second threshold (thr2), which are inputted as predetermined in the system. Varied by the system, the first threshold is determined according to the flatness of the image, and the second threshold is determined according to the edge level.

Figure 5:
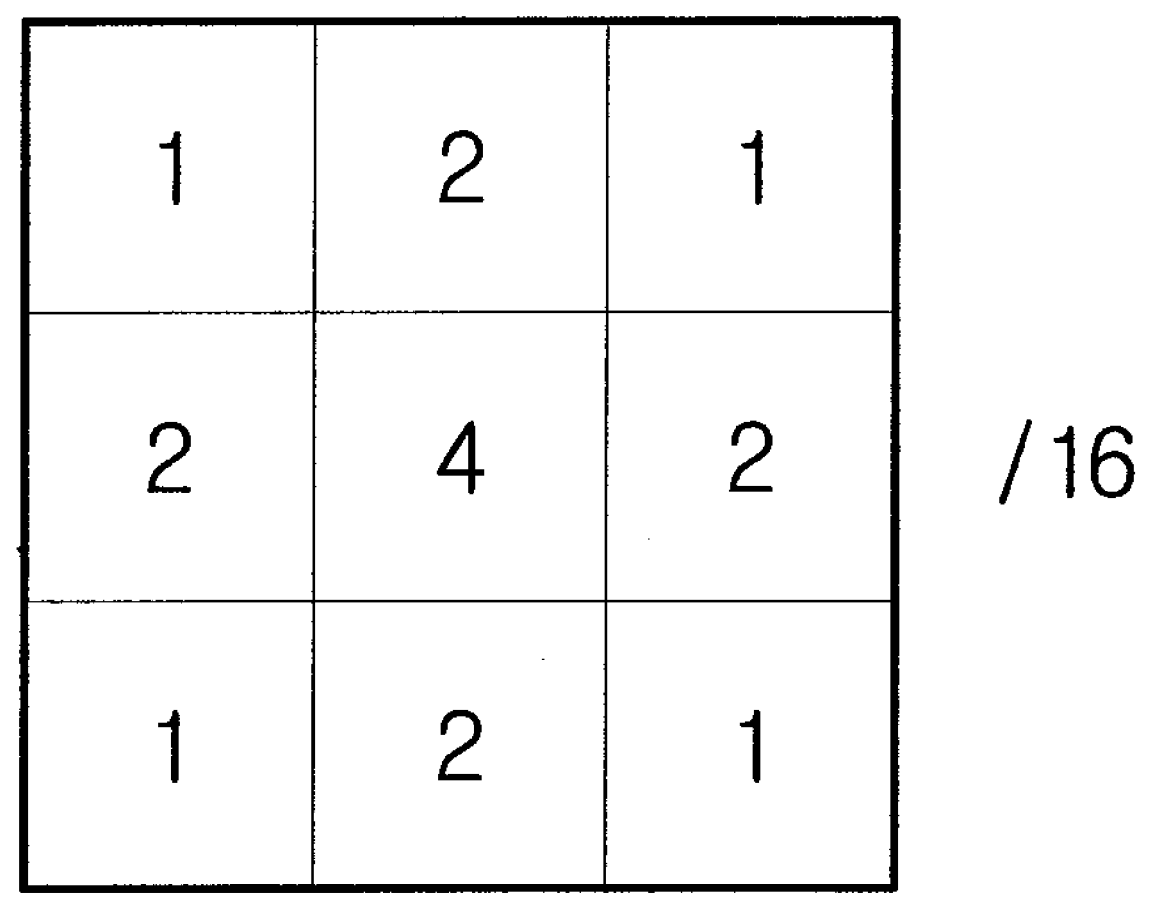

The noise removing method determining unit 220 determines that the image is flat (e.g. a wall) if diff_Y is smaller than the first threshold and performs a general filtering. That is, the noise removing method determining unit 220 determines to have the noise removed by applying the Gaussian filter unit 240, which performs the Gaussian filtering on the Y data having a 3×3 structure. FIG. 5 is an example of a Gaussian filter unit.

Although the Gaussian filtering is specifically described, the present invention is not restricted to the Gaussian filtering and can be applied to any filtering that can be used for removing noise.

The noise removing method determining unit 220 determines that the image neither has an edge nor is flat, that is, the image has features such as an outline (i.e. a general image), if diff_Y is equal to or greater than the first threshold and smaller than the second threshold. Then, the noise removing method determining unit 220 determines the output (Y_out) as Y5 and bypasses the output. In other words, it is determined that the image corresponding to this area does not need to remove noise.

Moreover, the noise removing method determining unit 220 determines that there is an edge if diff_Y is equal to or greater than the second threshold and decides to remove zipper noise. The zipper noise removing unit 230 removes the zipper noise. This will be described below with reference to the accompanying drawing.

Figure 6:
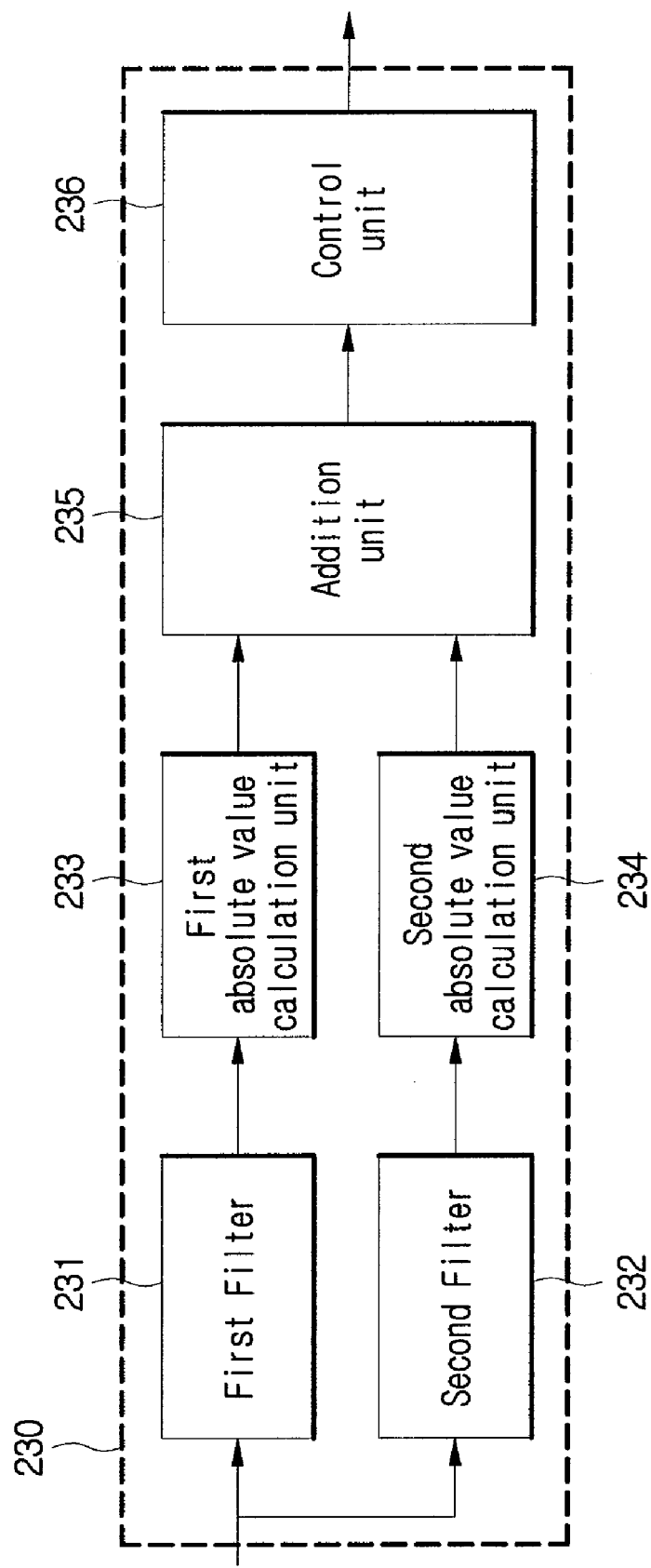
FIG. 6 shows a block diagram illustrating the structure of a zipper noise removing unit shown in FIG. 2.

FIG. 6 is a block diagram illustrating the structure of a zipper noise removing unit shown in FIG. 2.

As shown in the drawing, the zipper noise removing unit 230 of the present invention comprises a first filter 231, a second filter 232, a first absolute value calculation unit 233, a second absolute value calculation unit 234, an addition unit 235, and a control unit 236.

The first filter 231 and the second filter 232 determine how much edge components of the inputted Y component are in the horizontal and vertical direction, and are preferably a 3×3 filter. For this, it is preferable that the inputted Y component data is also 3×3. In an embodiment of the present invention, data such as reference 350 shown in FIG. 3 is inputted. However, the present invention is not restricted to this, and it shall be evident that any filter of an N×N structure can be used in accordance with the data inputted to the difference value arithmetic unit 210.

Figures 7, 8:
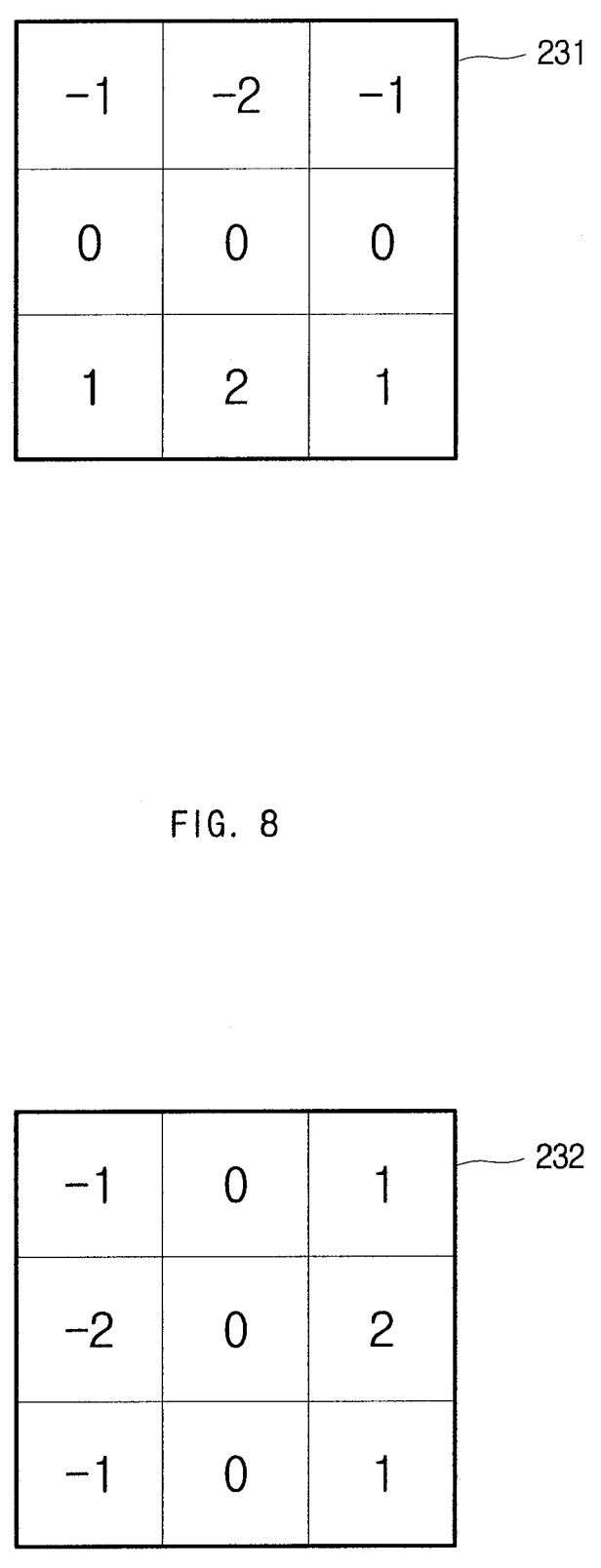
Figure 9:
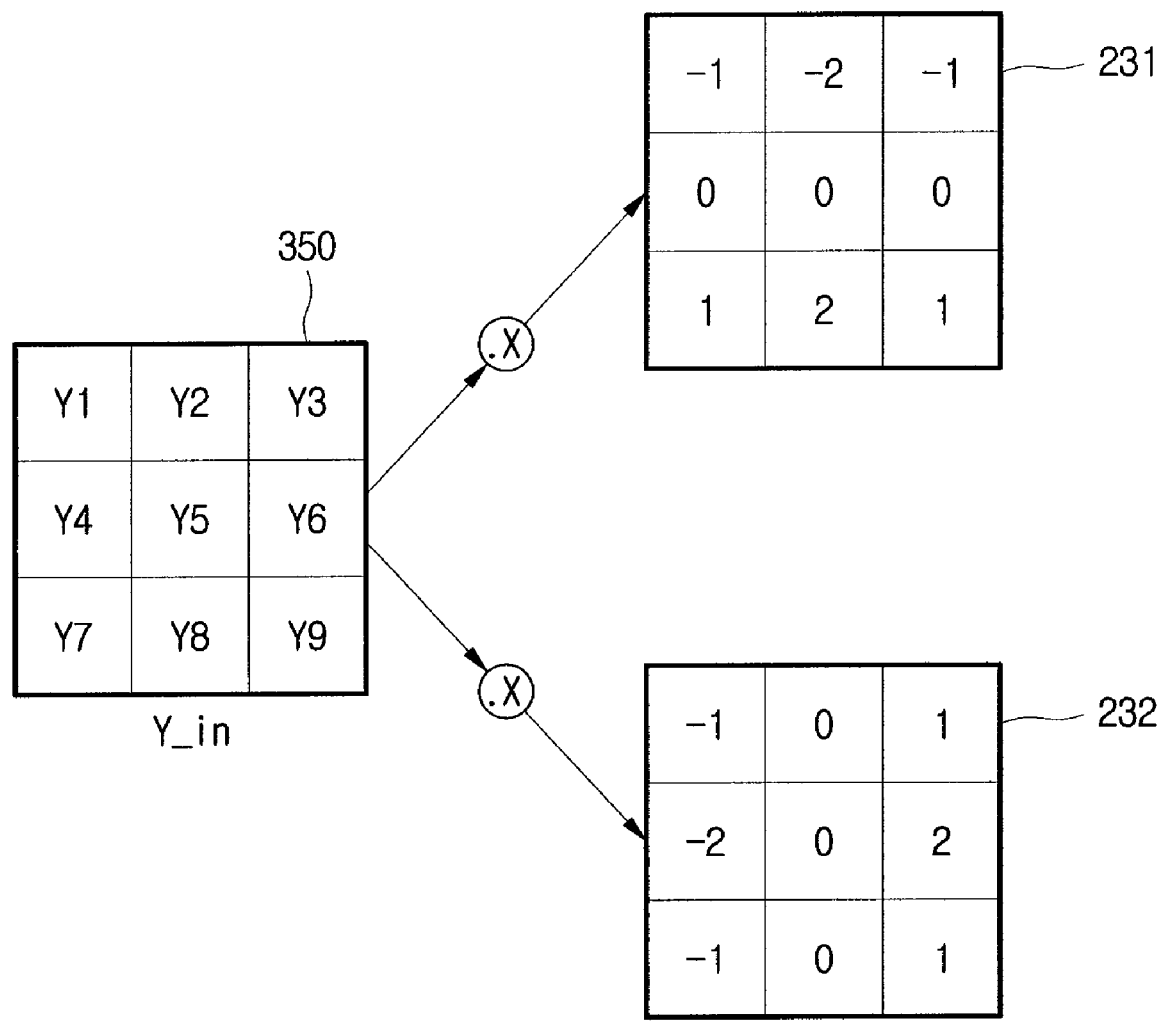
FIG. 9 shows an example of how Y data is inputted to the first filter and the second filter.

FIGS. 7 and 8 show examples of the first filter and the second filter, respectively, shown in FIG. 6, and FIG. 9 is an example of how Y data is inputted to the first filter and the second filter.

As described above, the first filter and the second filter shown in FIG. 7 and FIG. 8, respectively, are for determining the horizontal and vertical edge, respectively, of the inputted Y component data. As shown in FIG. 9, once the Y component data is inputted, each component is multiplied by the element of the same location. ".X", shown in FIG. 9, refers to multiplication of elements of the same location.

The first absolute value calculation unit 233 shown in FIG. 6 obtains the sum of elements from the output of the first filter 231 and calculates an absolute value. The output of the first absolute value calculation unit 233 is as follows:

$$abs\_S1 = abs(Y7 - 2 \times Y8 + Y9 - Y1 - 2 \times Y2 - Y3) \quad [\text{EQ. 1}]$$

Here, "abs" refers to an absolute value. The second absolute value calculation unit 234 shown in FIG. 6 obtains the sum of elements from the output of the first filter 232 and calculates an absolute value. The output of the second absolute value calculation unit 234 is as follows:

$$abs\_S2 = abs(Y3 + 2 \times Y6 + Y9 - Y1 - 2 \times Y4 - Y7) \quad [\text{EQ. 2}]$$

The addition unit 235 calculates the sum (abs_S) of the outputs of the first absolute value calculation unit 233 and the second absolute value calculation unit 234. The sum can be expressed as follows:

$$abs\_S = abs\_S1 + abs\_S2 \quad [\text{EQ. 3}]$$

The control unit 236 outputs the Y data filtered according to the output (abs_S) of the addition unit 235. If abs_S is greater than a third threshold, the control unit 236 determines that it is an edge, and determines whether it is a horizontal edge or a vertical edge.

If abs_S1 is greater than what abs_S2 is added by a fourth threshold, the control unit 236 determines that the output (Y_out) is an average of horizontal middle row, whose center is added by a weight. In other words, the output is as follows:

$$Y\_out = \frac{Y4 + 2 \times Y5 + Y6}{4} \quad [\text{EQ. 4}]$$

If abs_S2 is greater than what abs_S1 is added by a fourth threshold, the control unit 236 determines that the output (Y_out) is an average of vertical middle column, whose center is added by a weight. In other words, the output is as follows:

$$Y\_out = \frac{Y2 + 2 \times Y5 + Y8}{4} \quad [\text{EQ. 5}]$$

If abs_S is greater than a third threshold but does not belong to any of the above two cases, the control unit 236 determines that the output (Y_out) is an average of horizontal/vertical middle row/column, whose center is added by a weight. In other words, the output is as follows:

$$Y\_out = \frac{4 \times Y5 + Y2 + Y4 + Y6 + Y8}{8} \quad [\text{EQ. 6}]$$

If abs_S is smaller than a third threshold, the control unit 236 determines that the image does not have an edge and can determine that the output (Y_out) is Y5, which is the center value of the image.

Here, the third threshold is adjustable, and the fourth threshold can be determined to be 50. However, the present invention is not restricted to this threshold.

As such, the control unit 236 can control Y_out, which is the output of the zipper noise removing unit 230.

Although the conventional method of removing noise used one noise removing filter only, the present invention can achieve improved picture quality by choosing the method of removing noise according to the property of a particular image.

Figure 10:
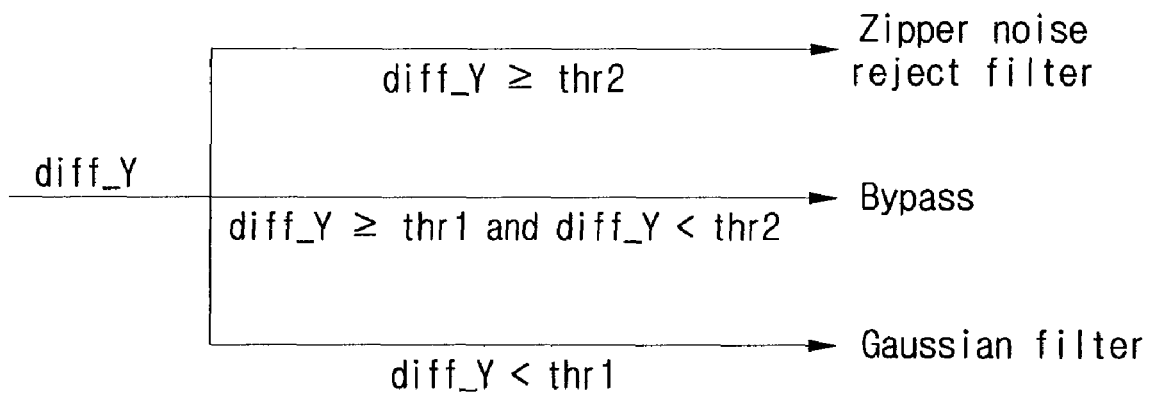
FIG. 10 shows a simplified diagram describing the noise removing device using an adjustable threshold in accordance with the present invention.

FIG. 10 is a simplified diagram illustrated to describe the noise removing device using an adjustable threshold in accordance with the present invention.

As shown in the figure, the device of the present invention performs a general filtering operation, such as the Gaussian filtering, if the calculated diff_Y is smaller than the first threshold, and bypasses the data if diff_Y is smaller than the second threshold and greater than or equal to the first threshold. If diff_Y is greater than or equal to the second threshold, the zipper noise gets removed.

As described above, the present invention can apply an appropriate noise removing method by adjusting the threshold in accordance with the peculiar value (difference between the maximum and minimum values) of pixels in the mask of a single image. As a result, improved picture quality can be achieved by allowing the user to remove noise as desired.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

What is claimed is:

1. A device for removing noise, comprising:
   a first arithmetic unit configured to determine a difference value between a maximum value and a minimum value of elements of inputted image data;
   a first determining unit configured to determine a method of removing noise of the image data from among a plurality of different noise removing methods in accordance with the difference value received from the first arithmetic unit; and
   a noise removing unit configured to remove noise in accordance with the method determined by the first determining unit,
   wherein the noise removing unit comprises:

a first filter unit configured to filter the image data, and a second filter unit configured to filter the image data to remove zipper noise, the second filter unit including a second arithmetic unit, and a control unit configured to determine output data according to an output of the second arithmetic unit, wherein the first determining unit determines to have filtering executed by inputting the image data to the second filter unit if the difference value is greater than or equal to a second threshold that is determined according to an edge level of an image, wherein the second filter unit further comprises:

a first filter configured to determine a horizontal edge of the image data, a second filter configured to determine a vertical edge of the image data, a first calculation unit configured to calculate an absolute value (abs_S1) of a sum of elements outputted from the first filter, and a second calculation unit configured to calculate an absolute value (abs_S2) of a sum of elements outputted from the second filter, and wherein the second arithmetic unit obtains a sum (abs_S) of output of the first calculation unit and the second calculation unit.

2. The device of claim 1, wherein the first arithmetic unit comprises:

a second determining unit configured to determine the maximum value of elements constituting the image data;

a third determining unit configured to determine the minimum value of elements constituting the image data; and a fourth determining unit configured to determine the difference value between the maximum value and the minimum value.

3. The device of claim 1, wherein the first determining unit determines to have filtering executed by inputting the image data to the first filter unit if the difference value is smaller than a first threshold that is determined according to a luminance level of an image.

4. The device of claim 3, wherein the first filter unit is a Gaussian filter.

5. The device of claim 1, wherein the first determining unit determines that the output is a value of a middle element of the image data if the difference value is greater than or equal to a first threshold that is determined according to a luminance level of an image and smaller than a second threshold that is determined according to an edge level of an image.

6. The device of claim 1, wherein the first filter is structured as follows:

| −1 | −2 | −1 |
|----|----|----|
| 0  | 0  | 0  |
| 1  | 2  | 1  |

.

7. The device of claim 1, wherein the second filter is structured as follows:

| −1 | 0 | 1 |
|----|---|---|
| −2 | 0 | 2 |
| −1 | 0 | 1 |

.

8. The device of claim 1, wherein the control unit determines that output data is a value of a middle element of the image data if abs_S is smaller than a third threshold.

9. The device of claim 1, wherein the control unit determines that output data is an average of horizontal middle row, whose center is added by a weight, if abs_S is greater than the third threshold, and abs_S1 is greater than what abs_S2 is added by a fourth threshold.

10. The device of claim 1, wherein the control unit determines that output data is an average of vertical middle column, whose center is added by a weight, if abs_S is greater than the third threshold, and abs_S2 is greater than what abs_S1 is added by the fourth threshold.

11. The device of claim 1, wherein the control unit determines that output data is an average of horizontal/vertical middle row/column, whose center is added by a weight, if abs_S is greater than the third threshold, and either abs_S1 is smaller than what abs_S2 is added by the fourth threshold, or abs_S2 is smaller than what abs_S1 is added by the fourth threshold.

* * * * *